June 14, 1960
D. C. OLSON
2,940,643
HANDLING TOOL
Filed June 6, 1958
2 Sheets-Sheet 2
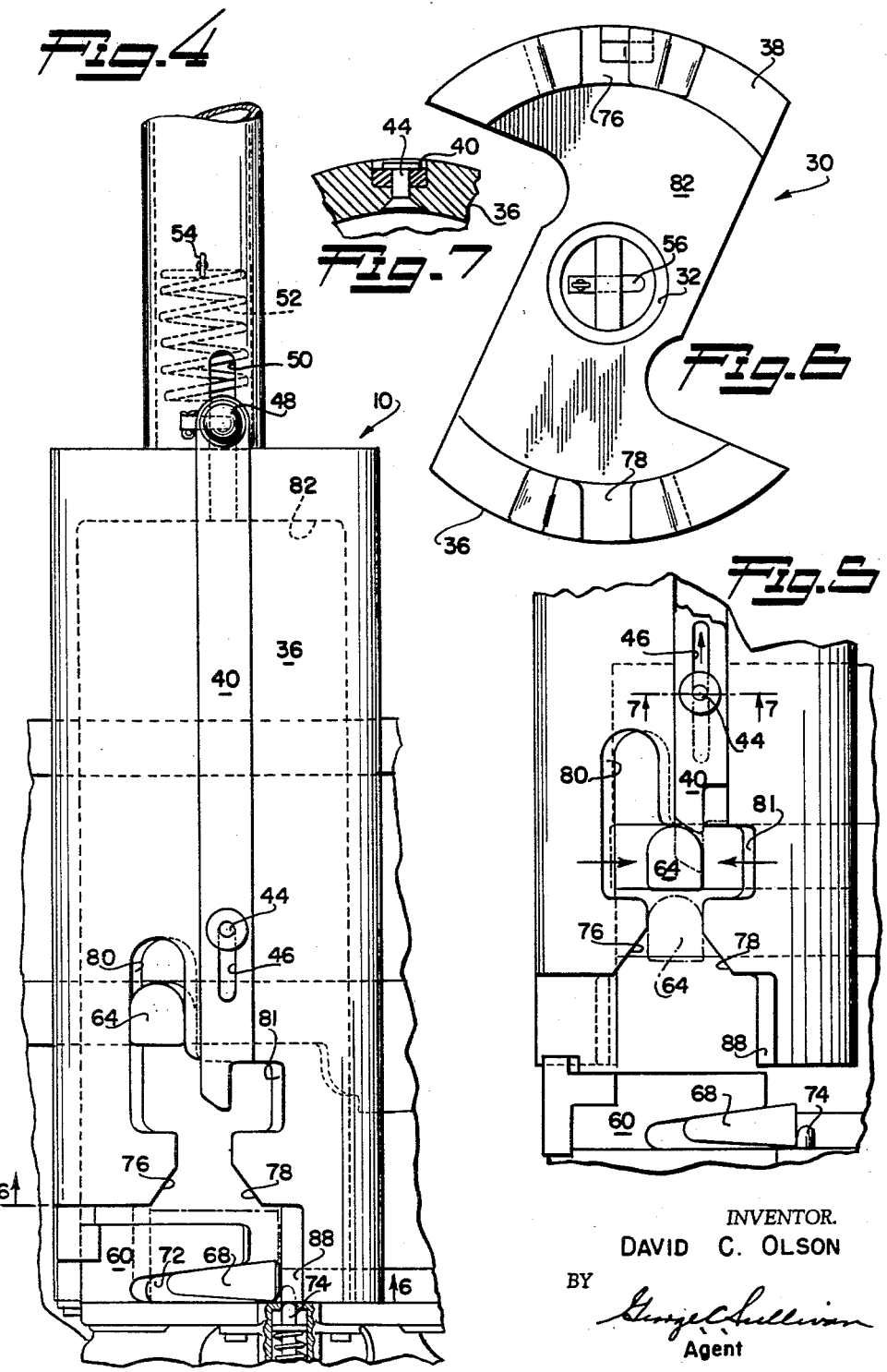
INVENTOR.
DAVID C. OLSON
BY
George C. Sullivan
Agent United States Patent Office 2,940,643
Patented June 14, 1960

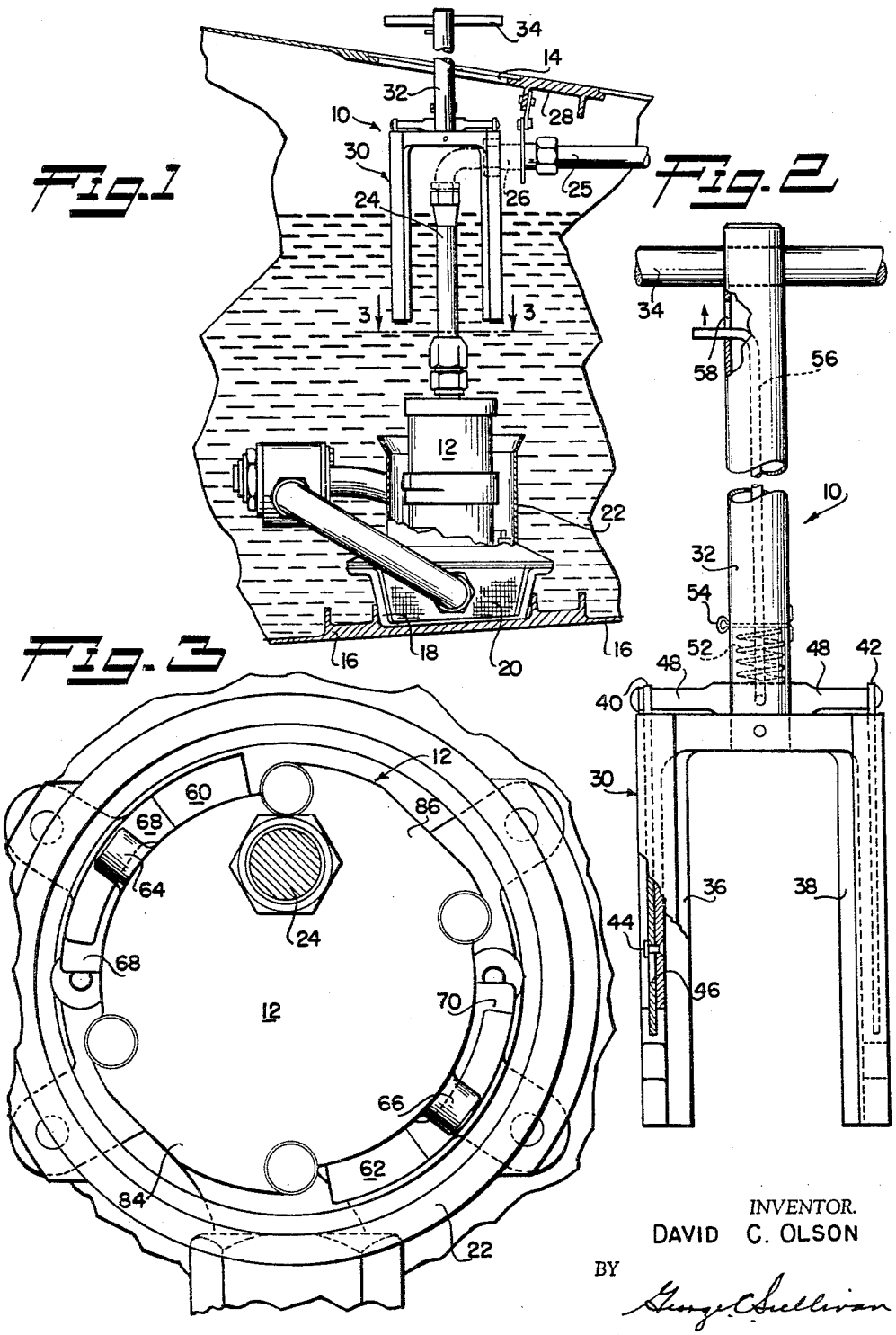

2,940,643
HANDLING TOOL

David C. Olson, Burbank, Calif., assignor to Lockheed Aircraft Corporation, Burbank, Calif.

Filed June 6, 1958, Ser. No. 740,282

14 Claims. (Cl. 222—333)

The present invention relates to handling tools and more particularly to tools for handling of body members in confined areas.

In many instances, handling tools have employed toggles and other mechanical linkages in order to pick up and operate on a body member, e.g. installation and removal of fuel pumps from aircraft wing tanks. The former handling tools have not been satisfactory because of fouling of movable mechanical linkages in the tool which are attached to a pump and coupled or uncoupled to the pump from the base.

These former tools often required close tolerances which made the tools unusable if the pump happened to be slightly imperfect in shape or size. Further, the tools were expensive because of the foregoing mechanical construction details.

The present invention overcomes the forementioned difficulties while providing an improved handling tool having an enclosure member including side and end walls and an open end for receiving a body member. The side walls of the body member are slotted and the slots open toward the open end of the enclosure member for individually receiving studs projecting radially from the body.

Preferably, the handling tool is utilized for removing fuel pumps in aircraft wing tanks wherein the pumps are releasably secured inside the tanks. The fuel pump to be handled has a generally cylindrical housing and a pair of studs projecting radially from opposite sides of the housing. Bayonet lugs project radially from opposite sides of the lower annular periphery of the pump housing coupling into bayonet slots in associated pump mounting brackets in the bottom of the aircraft wing tanks opposite a covered aperture in the upper surface of the wing tank for receiving the pump. The base for the pump includes a spring loaded detent normally projecting in the path of the bayonet lug adjacent the entrance opening to the bayonet slots in the mounting bracket to secure the pump in coupled position. Preferably, the pump handling tool includes a bifurcated enclosure member and a handle connected to the enclosure member by a shank and including a diametrically opposing cylindrical portion over the pump housing. Contoured slots are provided in the cylindrical portions of the enclosure member which extend longitudinally from the lower peripheral edge of the enclosure member for receiving a pair of studs on the periphery of the pump housing. The slot entrance is widened to accommodate a peripheral portion of the mounting brackets and the slot tapers from the entrance opening to provide restricted passage for the respective studs. The restricted passage opens into annularly adjacent slot extensions of different length for selectively receiving the individual studs and selectively limiting axial travel of the pump tool relative to the pump.

In the preferred arrangement, a releasable locking means includes bars individual to each contour slot resiliently biased to project into the respective path of the stud on the pump while passing through the restricted passage into either of the annularly adjacent slot extensions preventing the removal of the studs from the slot extensions prior to release of the locking means withdrawing the bars. The pump may be removed from the bracket by passing the enclosure member over the pump passing the studs into the longer of the slot extensions to position the lower peripheral edge of the enclosure member adjacent the contoured slot passed by the bracket whereby the pump bayonet lug depresses detent allowing the pump to be rotated for disconnecting the bayonet coupling.

A pump may be installed by passing the enclosure member over the pump permitting the stud to enter into the shortest slot extension to abut the sides and ends with respect to the shorter slot extension. The studs are restricted in movement to facilitate manipulation in axially and circumferential directions to depress the detent and couple the bayonet lug in the slot of the bracket.

An object of the present invention is the provision of an improved handling tool having an enclosure member for receiving a body member to manipulate the same.

Another object is to provide an improved pump handling tool for installation and removal of a body member from a confined enclosure.

A further object is the provision of a pump handling tool for enclosing and locking around a pump for coupling or uncoupling the pump in a pump base member.

Still another object is to provide an improved handling tool for pumps having studs on the housing and bayonet coupling in the base for seating in a pump base receiving bracket.

Other objects and features of the invention will become apparent to those skilled in the art as the disclosure is made in the following detailed description of a preferred embodiment of the invention as illustrated in the accompanying sheets of drawings in which:

Figure 1 is a plan view partly in section of a preferred embodiment of the invention;

Figure 2 illustrates a side elevation of the preferred embodiment of the embodiment shown in Figure 1;

Figure 3 is a top view of a booster pump taken from the line 3—3 of Figure 1 looking down in the direction of the arrows;

Figure 4 is a side view of a portion of the pump tool embodying the invention and illustrated in Figure 1 and portions of the pump to show the operation;

Figure 5 is a side elevation of a portion of the pump tool and portions of the pump to show the operation;

Figure 6 is a bottom plan view of the preferred embodiment taken along the line 6—6 of Figure 4; and Figure 7 is a sectional view of a portion of the pump tool showing the slidable locking bar in a wall of the pump tool and taken along the line 7—7 of Figure 5.

Referring now to the drawings, wherein like reference characters designate like corresponding parts throughout the several views, there is shown in Figure 1, which illustrates a preferred embodiment, a pump tool 10 being inserted over a fuel booster pump 12 in a wing fuel tank in which only a portion of the tank is shown to illustrate the operation of the tool on the pump. A fuel booster pump 12 is shown located directly below an aperture 14 in the top surface of a wing containing the fuel tank for passing the pump tool 10 for installation and removal of the fuel booster pump 12. The fuel booster pump 12 is mounted in the bottom of the tank directly opposite the aperture 14 on a strip 16, the outer surface of which is shown to form the lower surface of the wing.

A mounting strip 16 maintains a pump support or base assembly 18 in position in the bottom of the tank. The base assembly includes a screen assembly 20 for filtering the fuel passing into the booster pump to prevent sediment and the like from entering the fuel line.

The base assembly 20 may include a concentric guide tube 22 tapering from the upper annular edge toward the central axis of the base assembly and pump to guide the pump tool into the base 18. The booster pump 12 is connected to the fuel line by hose and connector assembly 24 which is releasably coupled to a fuel line 25 leading to the remainder of the fuel system by the flexible tube 26 supported along with the outgoing fuel line by a bracket 28 having a strap hanger supporting the tube 26.

In order to remove the fuel booster pump 12, a cover fitting into the aperture 14 sealing off the fuel tank is removed to permit pump tool to be inserted into the fuel tank. Prior to insertion of the tool, the pump is disconnected from the fuel line at the coupling between the hose 24 and tube 26. The tool is then passed through the aperture into the fuel tank passing the hose 24 by apertures in an end wall of the tool enclosure. A bifurcated enclosure member portion of the pump tool 10 is guided down around the booster pump 12 by the guide tube 22 whereupon the tool is manipulated to remove the fuel pump, as will be set forth in greater detail later on. After the fuel pump 12 has been uncoupled from the base, the pump tool 10 remains coupled to the fuel pump to remove the pump from the fuel tank through the aperture 14 whereupon a new pump may be installed.

In order to install a new pump the pump removed is uncoupled from the pump tool and a new pump coupled thereto whereupon it may be lowered into the fuel tank through the aperture 14 and guided into the base by guide tube 22.

Referring to Figure 2 for a detailed description of the pump tool 10, it is shown to include a bifurcated pump enclosure member 30 connected to a shank 32 at an end wall and a handle 34 passing through and connected to the upper end of the shank 32. The enclosure member includes longitudinal cylindrical side wall portions 36 and 38 for insertion over the pump housing. Releasable locking means for the tool include locking bars 40 and 42 which are slidably mounted in longitudinal grooves in the outer periphery of respective cylindrical side walls 36 and 38. One of these locking bars 40 can be viewed in side elevation in Figure 4 and in cross-section in Figure 7 where the pin 44 is shown passing through a side wall 36 of the enclosure member and the locking bar and through the longitudinal guide slot 46 in the locking bar 40. A pin coupling is also provided for the sliding bar 42 to permit longitudinal movement of both locking bars in unison by a cross arm 48 which passes through a longitudinal slot 50 in the hollow shank 32. The length of the slot 50 allows for the vertical travel of the cross arm 48 during the operation of the locking bars. The locking assembly is normally loaded or biased by a coil spring 52 seated on the center portion of the cross arm 48 lying within the shank 32. The coil spring 52 is maintained under compression by a cotter pin 54 passing the shank retaining the cross spring 52 biased against the cross arm 48. In order to manipulate the locking assembly, an extension is provided by the shaft 56 extending axially in the hollow shank 32 to a point adjacent the handle 34 where it projects radially through the longitudinal slot 58 and outside the shank 32 to be accessible for releasing the locking means by vertical movement toward the handle 34. As is more clearly shown in Figure 4, the shaft 56 is coupled to the cross arm 48 of the locking assembly by passing through an opening therein which is secured from withdrawal by a cotter pin.

The function of the pump tool 10 in the replacement of the fuel booster pumps is to first remove the fuel pump by reaching into the tank, grasping the pump, uncoupling it from the base assembly and removing the pump bodily from the tank. Having removed the old pump, it may be replaced with a new pump which is grasped by the tool and lowered into the tank and coupled to the base assembly whereupon the pump is released and the tool withdrawn. The body member or fuel pump being removed and installed is shown in Figure 3, in top plan view, along with the pump mounting brackets 60 and 62 which form a part of the support assembly 18.

The body member or pump has a generally cylindrical housing and a pair of studs 64 and 66 projecting from diametrically opposite side walls and annularly directed bayonet lugs 68 and 70 also projecting diametrically from opposite side walls but at the lower annular periphery of the pump housing. One of the mounting brackets is more clearly shown in side plan views of Figures 4 and 5 where the bayonet lug 68 is shown cooperating with bayonet slot in bracket 60. Cooperating with the bayonet coupling is a spring loaded detent 74 including a pin projecting above the base in the path of the bayonet lug and adjacent the entrance opening of the bayonet slot in the mounting bracket 60.

In the pump handle, the side walls or cylindrical members 36 and 38 have contoured slots 76 and 78 respectively extending longitudinally therein from their lower annular edges. Each slot has an entrance opening for receiving or fitting over a mounting bracket and the associated bayonet lug and extending annularly past the lug to clear the lug whereby the lower peripheral edge of the side wall may engage and depress the pin of the detent 74. The entrance opening for the contoured slots tapers to a restricted opening for passing and guiding the studs 64 and 66 into annularly adjacent and individual slot extensions 80 and 81 whereby rotation of the tool or pump clockwise or counter-clockwise determines the locked in position the studs will be located for installation or removal of a pump 12. As seen in Figure 5, the stud 64 is shown by dotted lines in the restricted opening or narrow passage of the slot 78. Further axial movement of the tool 10 positions the studs 64 and 66 between the slot extensions causing the locking bars 40 and 42 to be moved vertically in the direction indicated by the arrow to locate the studs in slot extensions 80 or 81 of respective contoured slots 76 and 78 depending upon the direction of rotation as indicated by the horizontal arrows. After the studs have been located in respective slot extensions the locking bars return to their biased position, as shown in dotted lines in Figure 5 and in the position of the locking bar 40 in Figure 4, to lock the studs in their respective slot extensions.

In Figure 6, end wall 82 of the enclosure member 30 is shown as a cut away strip running diagonally between the side walls 36 and 38 and contoured to pass the hose 24 and hose couplings while it is shown symmetrical for passing the hose and hose coupling past the end wall in either of two positions that the tool engages the pump. The bottom plan view of Figure 6 clearly shows the annular dimensions of the side walls 36 and 38 and the central position of the shank 32 and shaft 56. It is seen from viewing Figures 3 and 6 in combination that the pump tool side walls 36 and 38 fit over the pump between the radially projecting sections 84 and 86 of the pump side walls which are substantially in quadrature with the studs.

In operation a pump 12 may be removed from a tank by passing the enclosure member of the pump tool over the pump housing by axial movement of the pump tool locating the side walls of the enclosure member between sections 84 and 86 of the pump passing the hose 24 by one or other of the notches in the end wall. Continued axial movement of the pump tool locates the studs 64 and 66 in the respective contoured slots whereupon the tool is manipulated to guide the studs into the respective restricted openings. Since the locking bar is spring loaded into the path of the studs passing from the restricted openings of the slots into the slot extensions, the locking bars 40 and 42 are pushed back while the studs remain positioned between the slot extensions 80 and 81 of the respective slots. Rotation of the tool to the right or counter-clockwise, as viewed in Figure 5, locates the studs in the longer slot extensions 80 in respective side walls while additional axial movement positions the studs in the end of the longer slot extension 80 as shown in Figure 4, for removal of the pump 12. The end portion 88 of each side wall adjacent the slot opening passes by the base of the pump lugs 68 and 70 to engage and depress the pin of the spring biased detents 74.

The pump tool is now seated for removal of the pump and rotation of the pump tool to the right or counter-clockwise, as viewed in Figure 4, uncouples the bayonet coupling. Having uncoupled the pump from the mounting brackets and base assembly, the pump and pump tool is free to be lifted from the tank by the handle 34.

In order to install a new pump, the pump tool may be coupled to the new pump before insertion into the tank whereupon the pump is inserted in the enclosure between the side walls of the pump tool. The seating of the pump tool on the new pump is much the same as described before in the removal except that the pump tool is rotated to the left or clockwise as viewed in Figure 5, to locate the studs in the shorter slot extensions 81 whereupon the locking bar returns to its spring biased position locking the studs in the short slot extensions 81.

It may be noted that the lower portion of the locking bars engaging the studs is cut away to accommodate a portion of the studs when located in the shorter slot extensions 81. While locked in this position the pump is free from movement relative to the enclosure member for positioning the pump base assembly located in the fuel tank. In positioning the pump in the tank, the tool and pump base assembly 20 by the guide tube 22 as was the pump tool in removing the pump. In coupling the pump in the mounting bracket the axial pump tool travel is limited relative to the pump because of the shorter slot extension to prevent unnecessary interference with the bayonet coupling and simplifying the alignment as the pump lugs 68 and 70 depress the detent pin during the axial travel, positioning the bottom of the pump against the base. Rotation of the pump to the left, or clockwise, tightening the lug in the bayonet slot fastens or couples the pump in position permitting the detent pin of the detent assembly to return to biased position locking the pump lugs in the bayonet slots.

The removal of the pump tool from the pump requires that locking bars 40 and 42 be moved out of the path of the pump studs 64 and 66. This has been conveniently provided by manipulation of the shaft 56 toward the handle against the biased coil spring 52. Having unlocked the tool from the pump, the tool is rotated to the right or counter-clockwise relative to the pump to permit the studs to pass through the restricted opening of the respective contoured slots whereupon the tool may be lifted axially from the pump.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

I claim:

1. A handling tool of the type described comprising an enclosure member having side and end walls and an open end for receiving a body member, slots in the side walls of the enclosure member opening toward the open end for individually receiving radially projecting studs from the body member, the walls about each slot providing a restricted opening for respective studs to pass to either of two peripherally spaced slot extensions separated by the last mentioned slot wherein a slot extension is protracted to provide for extreme travel of the enclosure member.

2. A handling tool of the type described comprising an enclosure member having side and end walls and an open end for receiving a body member, slots in the side walls of the enclosure member opening toward the open end for individually receiving radially projecting studs from the body member, locking means including a bar slidably disposed in a side wall of the enclosure member resiliently biased into a slot and the path of a stud passing into the slot to prevent removal of the stud positioned in the slot and said bar being slidably out of the slot to permit stud removal.

3. A handling tool of the type described comprising an enclosure member having side and end walls and an open end for receiving a body member, slots in the side walls of the enclosure member opening toward the open end for individually receiving respective radially projecting studs from the body member, the walls about each slot being spaced to provide a restricted opening for respective studs to pass into peripherally spaced slot extensions wherein the slot extension is extended to provide for extreme travel of the enclosure member, a locking bar slidably disposed in the side walls of the enclosure member and resiliently biased into the path of a stud passing through the restricted opening into either slot extension to prevent rotation of the tool relative to the body after passing into either slot extension and said bar being slidable out of the path of the stud to permit stud removal.

4. A handling tool of the type described comprising an enclosure member having side and end walls and an open end for receiving a body member, slots in the side walls of the enclosure member opening toward the open end of the enclosure for individually receiving radially projecting studs from the body, locking means including a bar slidably disposed in the side wall of the member and resiliently biased into a slot opening in the path of a stud passing into said slot to prevent withdrawal of a stud located therein and means coupled to said bar operable against said bias to withdraw the bar from the slot opening and the path of the stud to allow passage of the stud past the bar and out of the slot thereby removing the tool from the body.

5. A handling tool of the type described comprising a bifurcated enclosure member having diametrically opposing side walls and an end wall providing an open end for receiving a body member having radially projecting studs, diametrically opposing slots in the opposing side walls of the enclosure member opening toward the open end of the enclosure member for individually receiving the radially projecting studs from the body member, locking means including bars slidably disposed in the diametrically opposing side walls of the enclosure member resiliently biased into the respective slots and the paths of the studs passing in the slot to prevent removal of the studs positioned in the slot and said bars being slidable out of the respective slots and the paths of the studs to permit removal of the studs against the resilient bias.

6. A handling tool of the type described comprising a bifurcated enclosure member having diametrically opposing side walls and an end wall providing an open end for receiving a body, diametrically opposing slots in the opposing side walls of the enclosure member opening toward the open end for individually receiving radially projecting studs from the body member, locking means including bars slidably disposed in the diametrically opposing side walls of the enclosure member and resiliently biased into the slot opening and into the path of the studs passing into the slots to prevent withdrawal of the studs located therein and means commonly coupled to both of said bars and operable against said bias to withdraw the bars from the slot openings and the paths of the studs to permit passage of the studs past the bars for removing the tool from the body.

7. In combination, a handling tool and a body member having diametrically opposing radially projecting studs for coupling into said handling tool and diametrically opposing radially projecting lugs for coupling into bayonet slots in a relatively inaccessible mounting bracket, said tool comprising a bifurcated enclosure member having side and end walls and an open end for passing the enclosure member over the body member, diametrically opposing slots formed in said side walls for passing said studs, each of the side walls being spaced about their respective slots to accommodate the mounting bracket in the open ends of the slots, said spaced side walls each tapering from the open end to provide narrow passages for the studs leading to two individual annularly spaced slot extensions separated by the last mentioned slot for each slot for rotationally locating the respective studs in the side walls and positioning the tool on the body member.

8. In combination, a handling tool and a body member having diametrically opposing radially projecting studs coupling into said handling tool and diametrically opposing radially projecting lugs for coupling into bayonet slots in a relatively inaccessible mounting bracket, said tool comprising a bifurcated enclosure member having side and end walls and an open end for passing the body member into the enclosure member, diametrically opposing slots formed in said side walls for passing and locating said studs in the side walls, each of the side walls being spaced about their respective slots to accommodate the mounting bracket in the respective entrance opening of the slots, said spaced side walls each tapering from the open end to provide narrow passages for the studs leading to two individual annularly spaced slot extensions separated by the last mentioned slot for each slot for rotationally locating the respective studs in the side walls and positioning the tool on the body member, one of said slot extensions projecting longitudinally and being located relative to the open end of the slot to provide for axial travel of the tool positioning the respective mounting bracket in the open ends of the respective slots.

9. In combination, a handling tool and a body member having diametrically opposing radially projecting studs coupling into said handling tool and diametrically opposing radially projecting lugs for coupling into bayonet slots in a relatively inaccessible mounting bracket, said tool comprising a bifurcated enclosure having side and end walls and an open end for passing the body member, diametrically opposing slots formed in said side walls for passing and locating said studs in the side walls, each of the side walls being spaced about their respective slots to accommodate the mounting bracket in the open ends of the slots, said spaced side walls each tapering from the open end to provide narrow passages for the studs leading to two individual peripherally spaced slot extensions separated by the last mentioned slot for each slot for rotationally locating the respective studs in the side walls and positioning the tool on the body member, locking means including bars slidably disposed longitudinally in respective side walls and resiliently biased into the slots in the respective paths of the studs passing into the peripherally spaced slot extensions for each slot and preventing withdrawal of studs located in the slot extensions.

10. In combination, a handling tool and a body member having diametrically opposing radially projecting studs coupling into said handling tool and diametrically opposing radially projecting lugs for coupling into bayonet slots in a relatively inaccessible mounting bracket, said tool comprising a bifurcated enclosure member having side and end walls and an open end for passing the body member, diametrically opposing slots formed in said side walls for passing and locating said studs, each of the side walls being spaced about their respective slots to accommodate the mounting bracket in the open ends of the slots, said spaced side walls each tapering from the open end about their respective slots to provide narrow passages for the studs leading to two individual peripherally spaced slot extensions separated by the last mentioned slot for each slot for rotationally locating the respective studs in the side walls and positioning the tool on the body member, means including a spring biased detent selectively projecting into and out of the path of the diametrically opposing radially disposed lugs and opposing the bayonet slots in the bracket and preventing rotation of the body member tending to remove the bayonet lug from the slot in the mounting bracket.

11. In combination, a body member having diametrically opposing radially projecting studs for coupling corresponding bayonet lugs in relative inaccessible slots in mounting brackets and a handling tool comprising a bifurcated enclosure member having side and end walls and an open end for passing the body member, diametrically opposing slots formed in said side walls for passing said studs, each of the side walls being spaced about their respective slots to accommodate the mounting bracket in the open ends of the slots, said spaced side wall tapering from the open end about their respective slots to provide narrow passages for the studs and annularly spaced slot extensions separated by the last mentioned slots for each slot for rotationally locating the respective studs in the side walls and positioning the tool on the body member, means including a spring biased detent pin projecting into the path of the diametrically opposing radially disposed lugs and opposing the bayonet slots in the bracket and preventing rotation of the body member tending to remove the bayonet lug from the slot in the mounting bracket, one of said slot extensions for each slot projecting longitudinally and being located relative to the open end of the slot to provide for axial travel of the tool positioning the respective mounting bracket in the open ends of the respective slots wherein the end of the side wall adjacent the open end of each slot passes by the bayonet lug seated in the bayonet slot to engage the detent removing the detent pin from the paths of the lugs to permit rotation of the body member and removal of the same from the mounting bracket.

12. In aircraft wing tanks having fuel pumps releasably secured inside the tanks, the combination comprising a fuel pump having a generally cylindrical housing and a pair of studs projecting radially from opposite sides of the housing and bayonet lugs projecting radially from opposite sides of the lower periphery of the cylindrical pump housing; a pump mounting bracket having bayonet slots for rotatably receiving the bayonet lugs and secured to the bottom of a wing tank opposite a covered aperture for receiving the pump; a spring loaded detent selectively projecting in and out of the path of a bayonet pump lug adjacent the entrance opening of the bayonet slot; and a pump handling tool for insertion and removal of the pump in the pump mounting bracket comprising an enclosure member including cylindrical portions for insertion over the pump housing having contoured slots extending longitudinally from the lower peripheral edge for receiving the pair of studs and a peripheral portion of the mounting bracket, said contoured slots having restricted openings for passing the respective pump studs and leading to annularly adjacent slot extensions of different length for receiving the individual studs to selectively limit the axial travel of the pump tool relative to the pump wherein a pump may be removed from the bracket by passing the enclosure member over the pump passing the studs into the longer of the slot extensions to position the lower peripheral edge of the enclosure member adjacent the contoured slot to pass by the bracket whereby the pump bayonet lug depresses the detent allowing the pump to be rotated for disconnecting the bayonet coupling and a pump may be installed by passing the enclosure member over the pump passing the studs into the shorter slot extension to abut the sides and ends of the respective shorter slot extension for transmitting axial force from the body member to the pump for axial movement of its pump into the bracket, depressing the detent and rotational force to couple the bayonet lug of the pump in the bayonet slot of the bracket.

13. In aircraft wing tanks having fuel pumps releasably secured inside the tanks, the combination comprising a fuel pump having a generally cylindrical housing and a pair of studs projecting radially from opposite sides of the housing and bayonet lugs projecting radially from opposite sides of the lower periphery of the cylindrical pump housing; a pump mounting bracket having bayonet slots for rotatably receiving the bayonet lugs and secured to the bottom of a wing tank opposite a covered aperture for receiving the pump; a spring loaded detent selectively projecting in and out of the path of a bayonet pump lug adjacent the entrance opening of the bayonet slot; and a pump handling tool for insertion and removal of the pump in the pump mounting bracket comprising, a handle, an enclosure member and a shank connecting the handle to said enclosure member, said enclosure member including cylindrical portions for insertion over the pump housing having contoured slots extending longitudinally from the lower peripheral edge for receiving the pair of studs and a peripheral portion of the mounting bracket, said contoured slots having a restricted opening for passing the respective pump studs and leading to annularly adjacent slot extensions of different length for receiving the individual studs to selectively limit the axial travel of the pump tool relative to the pump wherein a pump may be removed from the bracket by passing the enclosure member over the pump passing the studs into the longer of the slot extensions to position the lower peripheral edge of the enclosure member adjacent the contoured slot to pass by the bracket whereby the pump bayonet lug depresses the detent allowing the pump to be rotated for disconnecting the bayonet coupling and a pump may be installed by passing the enclosure member over the pump passing the studs into the shorter slot extension to abut the sides and ends of the respective shorter slot extension for transmitting axial force from the body member to the pump for axial movement of its pump into the bracket and depressing the detent and rotational force to couple the bayonet lug of the pump in the bayonet slot of the bracket.

14. In aircraft wing tanks having fuel pumps releasably secured inside the tanks, the combination comprising a fuel pump having a generally cylindrical housing and a pair of studs projecting radially from opposite sides of the housing and bayonet lugs projecting radially from opposite sides of the lower periphery of the pump housing; a pump mounting bracket having bayonet slots for rotatably receiving the bayonet lugs and secured to the bottom of a wing tank opposite a covered aperture for receiving the pump; a spring loaded detent projecting in the path of a bayonet pump lug adjacent the entrance opening of the bayonet slot; and a pump handling tool for insertion and removal of the pump in the pump mounting bracket comprising a bifurcated enclosure member including diametrically opposing cylindrical portions for insertion over the pump housing having substantially identical diametrically opposing contoured slots extending longitudinally from the lower peripheral edge for receiving the pair of studs and a peripheral portion of the mounting bracket, said contoured slots tapering to provide restricted passage of the respective pump studs and opening into annularly adjacent slot extensions of different length for selectively receiving the individual studs and selectively limit the axial travel of the pump tool relative to the pump and releasable locking means including bars individual to each contour slot resiliently biased to project into the respective paths of the studs passing through the restricted passages into either of the annularly adjacent slot extensions to prevent the removal of the studs from the slot extensions prior to release of the locking means withdrawing the bars wherein a pump may be removed from the bracket by passing the enclosure member over the pump passing the studs into the longer of the slot extensions to position the lower peripheral edge of the enclosure member adjacent the contoured slot to pass by the bracket whereby the pump bayonet lug depresses the detent allowing the pump to be rotated for disconnecting the bayonet coupling and a pump may be installed by passing the enclosure member over the pump passing the studs into the shorter slot extension to abut the sides and ends of the respective shorter slot extensions for transmitting axial force from the body member to the pump for axial movement of its pump into the bracket, depressing the detent and rotational force to couple the bayonet lug of the pump in the bayonet slot of the bracket.

References Cited in the file of this patent

UNITED STATES PATENTS

| | | |
|---|---|---|
| 1,352,638 | Thompson | Sept. 14, 1920 |
| 2,619,861 | Wanamaker | Dec. 2, 1952 |

FOREIGN PATENTS

| | | |
|---|---|---|
| 10,746 | Great Britain | May 30, 1895 |
| 577,164 | Great Britain | May 7, 1946 |